May 15, 1923.

E. SCHULTHESS

HOSE

Filed Sept. 28, 1921

1,455,359

WITNESS

INVENTOR
ERNEST SCHULTHESS
BY
ATTORNEYS

Patented May 15, 1923.

1,455,359

UNITED STATES PATENT OFFICE.

ERNEST SCHULTHESS, OF SOUTH ORANGE, NEW JERSEY.

HOSE.

Application filed September 28, 1921. Serial No. 503,936.

*To all whom it may concern:*

Be it known that I, ERNEST SCHULTHESS, a citizen of the United States, and resident of South Orange, county of Essex, and State of New Jersey, have invented certain new and useful Improvements in Hose, of which the following is a specification.

My invention relates to hose for conducting water and other fluids and has for its object to provide a hose of novel construction which is of minimum weight and of maximum flexibility and strength. Other more specific objects of my invention will appear from the description hereinafter and the features of novelty will be pointed out in the appended claims.

Figure 1:
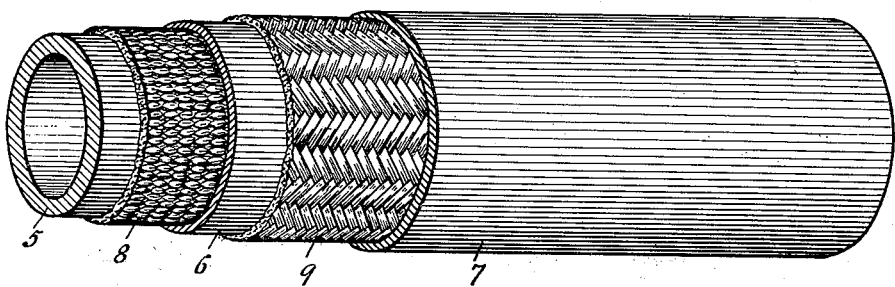
Figure 2:
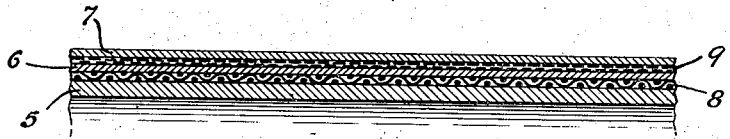

In the accompanying drawings, which illustrate an example of my invention without defining its limits, Figure 1 is an exterior view of the hose with parts broken away, and Fig. 2 is a fragmentary longitudinal section thereof.

The hose comprises alternate layers of rubber and woven and braided fabric, the inner and outer surfaces of the hose being formed of rubber between which the fabric layers and an intermediate layer of rubber is located. In the preferred construction, as shown in the drawings, 5, 6 and 7 represent the layers of rubber; 8 represents the layer of woven fabric located between the inner layer of rubber 5 and the intermediate layer of rubber 6, while 9 represents the layer of braided fabric located between the intermediate layer of rubber 6 and the outer layer of rubber 7. It will be understood that the woven layer of fabric 8 and the braided layer of fabric 9 are constructed in the form of continuous tubes preferably seamless which completely surround the rubber layers 5 and 6 respectively, the outer layer 7 of rubber forming an enclosing envelope in which the other layers are contained. In some cases, the location of the woven fabric 8 and the braided fabric 9 may be reversed with respect to each other; in other words, the woven fabric 8 may be located between the rubber layers 6 and 7 and the braided fabric 9 located between the rubber layers 5 and 6. In any case, the woven fabric 8 which enables the hose to resist relatively great pressures is itself protected against the action of any moisture whereby it would be weakened. The woven fabric 8, by reason of its construction, resists expansion of the hose and thus provides the strength which is essential in hose intended for resisting heavy pressures, while the braided fabric 9, being capable of more or less elongation, adds considerable strength to the hose and yet does not interfere materially with the flexing thereof. At the same time the braided fabric 9 acts as a protection to the layer of rubber 6 which surrounds and protects the woven fabric 8, said braided fabric 9 itself being fully protected by the outer layer of rubber 7; with this arrangement both fabric layers are completely enclosed in rubber envelopes and accordingly are protected against disintegration resulting from contact with moisture in any form. Furthermore, the braided fabric 9 prevents twisting of the hose when in use and neutralizes any tendency to twist whereby the factor of safety in handling the hose, and more particularly fire hose, is materially increased. The intermediate layer of rubber 6, in addition to its functions as a protecting medium for the woven fabric 8, also serves as a cushion for both the woven and braided fabrics and takes care of the expansion and contraction thereof while the hose is being folded or kinked. The combination of woven and braided fabrics with the rubber, as illustrated and described, also prevents the formation of sharp bends, particularly along opposite longitudinal edges when the hose is wound upon a reel and thereby preserves the life of the hose by reducing the probability of breakage along the folded edges. The improved hose is particularly adapted for use as fire hose, although it is equally useful for conducting fluids other than water and provides an arrangement in which the fabric layers are fully protected against the injurious action of such fluids and of the atmosphere.

Various modifications in the specific construction shown and described may be made within the scope of the claims without departing from the spirit of my invention.

I claim:

1. A hose comprising an inner layer of vulcanized rubber and an outer layer of vulcanized rubber, layers of seamless circular woven and seamless braided fabrics between said inner and outer vulcanized rubber layers, respectively, and a cushioning layer of vulcanized rubber between said layers of fabrics.

2. A hose comprising an inner layer of vulcanized rubber, an intermediate layer of vulcanized rubber, an outer layer of vulcanized rubber, a layer of seamless circular woven fabric between said inner and intermediate layers of vulcanized rubber, and a layer of seamless circular braided fabric between said intermediate and outer layers of vulcanized rubber.

In testimony whereof I have hereunto set my hand.

ERNEST SCHULTHESS.